J. L. Bates,
Steam-Engine Packing.
No. 3,108. Reissued Sep. 1, 1868.
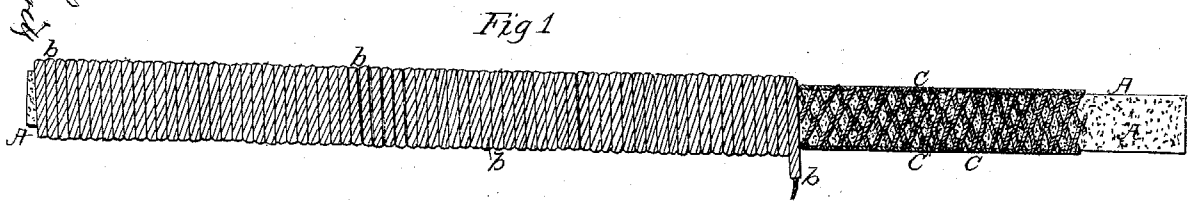
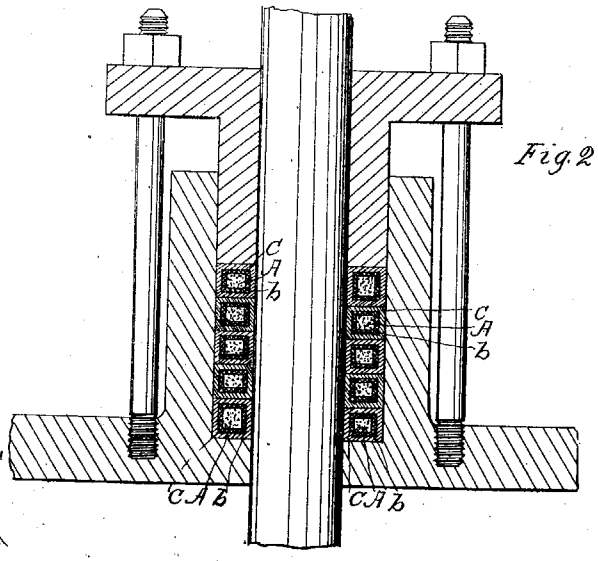
Witnesses:
A. H. Kupp
Wm. Mat. Merrill
Inventor.
James L. Bates
by his assignee
Wm Hartley Miller

United States Patent Office.

WILLIAM HARTLEY MILLER, OF PHILADELPHIA, PENNSYLVANIA, ASSIGNEE OF JAMES L. BATES, OF PROVIDENCE, RHODE ISLAND.

*Letters Patent No.* 36,987, *dated November* 25, 1862; *reissue No.* 3,108, *dated September* 1, 1868.

IMPROVEMENT IN STEAM-ENGINE PACKING.

The Schedule referred to in these Letters Patent and making part of the same.

TO ALL WHOM IT MAY CONCERN:

Be it known that JAMES L. BATES, of the city of Providence, in the county of Providence, and State of Rhode Island, did invent a new and improved Packing for Stuffing-Boxes and other parts of Steam-Engines, Pumps, and other Apparatus; and I do hereby declare that the following is a full, clear, and exact description of the same, reference being had to the accompanying drawings, forming part of this specification, in which—

Figure 1 represents a longitudinal view of a piece of the improved packing.

Figure 2 is a central section of a stuffing-box, having the packing applied within it.

Similar letters of reference indicate corresponding parts in the figures.

The nature of this invention consists in providing a filling of cork, cotton, or other suitable material, with a fibrous cover, composed of cotton or other soft fibrous material, woven, braided, or wound around the filling.

To enable others skilled in the art to make and use this invention, I will proceed to describe its construction and operation.

A represents a fillet or strip of cork cut of uniform size, and *b* a cotton-covered twine, with which it is covered.

*c* is an open braiding, of twine or other light material, braided on the cork before the outer covering *b* is applied, its object being to strengthen the cork and enable it to be bent without being broken.

The external covering *b* is composed of a twine thickly covered with soft cotton, as shown in the drawing, the cotton being wound upon it in the form of a soft sliver, and the twine being merely to hold the soft cotton together, and give it a desirable degree of tenacity. The said covering *b* is wound closely around the braided fillet of cork, or this covering *b* is first wound around the cork and the braided cover applied externally, as shown by letter *c*.

The packing may be made in pieces of any length, and of any required diameter or thickness, and kept for use in coils of convenient size, its flexibility being sufficient to enable it to be coiled up. The cork may be made in pieces of as great a length as can be obtained, or of any convenient length, united by scarf-joints.

One great advantage of the braiding *c* is that it strengthens and preserves the scarf-joints by which the fillets of cork are united, and makes a compact covering, which renders the packing more serviceable, and enables the filling more readily to be brought into use. The said braiding is indispensable, since without it the cork would be destroyed too rapidly for practical use.

This packing is used in the same manner as India-rubber or other packing, which is used in fillets or strips, being saturated as much as possible with melted tallow, and then coiled up within the stuffing-box or other joint where it is to be used, and pressed tight by the gland or follower.

The advantages of this packing, as compared with India-rubber packing, have been demonstrated by actual trial in the stuffing-boxes of a locomotive-piston rod. Of the India-rubber packing, costing one dollar per pound, about one pound is necessary for each stuffing-box. Of this packing, costing but half a dollar a pound, only one-third of a pound is required; hence its first cost is but one-sixth that of India rubber, but as it is at least three times more durable, its real cost is only about one-twentieth that of India rubber. It is more pliable and sustains a greater pressure than India-rubber packing, and it does not melt, and clog the piston-rod, as the India rubber does.

What I claim as my invention, and desire to secure by Letters Patent, is—

1. The combination of the fillet or strip of cork A, and the covering *b*, composed of twine covered with soft cotton or other soft fibrous material, substantially as herein specified.

2. The braiding *c*, applied in combination with the fillet or strip A and covering *b*, substantially as herein specified.

3. The construction of packing, substantially as herein set forth.

4. The construction of fibrous-braid coverings for packing, substantially as shown.

WM. HARTLEY MILLER.

Witnesses:

I. C. SLATER,

A. F. A. KING.